United States Patent [19]
Bolland et al.

[11] Patent Number: 6,075,109
[45] Date of Patent: Jun. 13, 2000

[54] METHOD OF FORMING A GRANULAR SILOXANE GEL HAVING REDUCED CHLORIDE CONTENT

[75] Inventors: Stuart Michael Bolland, Porthcawl, United Kingdom; Ollie William Marko, Carrollton, Ky.

[73] Assignee: Dow Corning Corporation, Midland, Mich.

[21] Appl. No.: 09/213,455

[22] Filed: Dec. 17, 1998

[51] Int. Cl.⁷ .................................................. C08G 77/06
[52] U.S. Cl. ................................. 528/10; 528/20; 524/837
[58] Field of Search .................... 528/10, 20; 524/837

[56] References Cited

U.S. PATENT DOCUMENTS

| | | | |
|---|---|---|---|
| 4,221,691 | 9/1980 | Danielson et al. | 260/33.6 SB |
| 4,408,030 | 10/1983 | Marko | 528/10 |
| 4,960,523 | 10/1990 | Degen et al. | 210/721 |
| 4,961,861 | 10/1990 | Degen et al. | 210/717 |
| 5,945,497 | 8/1999 | Marko et al. | 528/12 |

*Primary Examiner*—Margaret G. Moore
*Attorney, Agent, or Firm*—Melvin D. Fletcher

[57] ABSTRACT

A method of forming a granular siloxane gel having reduced chloride content. The method comprises contacting a chlorosilicon mixture with an aqueous medium at a temperature within a range of about 50° C. to 180° C. to form a granular siloxane gel, and washing the granular siloxane gel with an aqueous solution comprising a surfactant having a HLB number within a range of about 1 to 28.

19 Claims, No Drawings

6,075,109

METHOD OF FORMING A GRANULAR SILOXANE GEL HAVING REDUCED CHLORIDE CONTENT

BACKGROUND OF INVENTION

The present invention is a method of forming a granular siloxane gel having reduced chloride content. The method comprises contacting a chlorosilicon mixture with an aqueous medium at a temperature within a range of about 50° C. to 180° C. to form a granular siloxane gel, and washing the granular siloxane gel with an aqueous solution comprising a surfactant having a HLB number within a range of about 1 to 28.

Danielson et al., U.S. Pat. No. 4,221,691, teach that the addition of a hydrocarbon oil to a polyfunctional chlorosilicon composition prior to hydrolysis produces more uniform, non-sticky gels and improves the handling of the siloxane gel that is obtained. However, adding a hydrocarbon oil may present an additional expense in the waste treatment process and has numerous environmental disadvantages.

Marko, U.S. Pat. No. 4,408,030, describes a process for treating a plurality of chlorosilane by-product streams in an aqueous medium at elevated temperature to obtain a solid siloxane material or gel that is easily handled.

Degen et al., U.S. Pat. Nos. 4,960,523 and 4,961,861, describe a process where the high-boiling solids-containing residues obtained in the synthesis of organochlorosilanes are hydrolyzed and then oxidized in the presence of oxygen and a surface-active agent which hydrophilicizes the surface of the solids.

The present invention provides a method for recovering valuable residual chloride from granular siloxane gels for recycling. Furthermore, the present invention provides a method for reducing the chloride content of siloxane gels thereby improving handling safety in subsequent operations and reducing transportation and disposal cost of the less corrosive gels.

SUMMARY OF INVENTION

The present invention is a method of forming a granular siloxane gel having reduced chloride content. The method comprises contacting a chlorosilicon mixture with an aqueous medium at a temperature within a range of about 50° C. to 180° C. to form a granular siloxane gel, and washing the granular siloxane gel with an aqueous solution comprising a surfactant having a HLB number within a range of about 1 to 28.

DESCRIPTION OF THE INVENTION

The present invention is a method of forming a granular siloxane gel having reduced chloride content. The method comprises contacting a chlorosilicon mixture with an aqueous medium at a temperature within a range of about 50° C. to 180° C. to form a granular siloxane gel, and washing the granular siloxane gel with an aqueous solution comprising a surfactant having a HLB number within a range of about 1 to 28.

The present method may be conducted in any standard reactor suitable for contact with chlorosilanes. The contacting may be carried out in a batch, semi-continuous, or continuous mode.

The chlorosilicon mixture comprises high-boiling residue by-product streams and low-boiling residue by-product streams resulting from the production of methyl chloride with silicon metalloid. In the present method the weighted average of the number of Si—Cl bonds in the mixture must be greater than or equal to 2.8. The average SiCl functionality of the mixture to be hydrolyzed is kept within the prescribed limit by determining the average SiCl functionality of the appropriate by-product and/or waste stream and blending streams to arrive at the desired average SiCl functionality. For the present invention the term "SiCl functionality" of a given chlorosilicon mixture is defined as the average number of Si-Cl bonds in the chlorosilicon mixture. The average SiCl functionality of a stream or mixture is the weighted average of SiCl functionality of all Si—Cl containing compounds in the stream or mixture. The non Si—Cl containing compounds and any unidentified compounds in the mixture are not considered in the determination of the average SiCl functionality. In other words, the relative amounts of all Si—Cl containing compounds are normalized to 100% total in determining the average SiCl functionality of the mixture. In a similar fashion, the average SiCl functionality of a blended stream is the weighted average of the SiCl functionality of all Si—Cl containing compounds in the blended stream where the relative amounts of the individual SiCl compounds are normalized to 100%. Marko, U.S. Pat. No. 4,408,030, which describes a process for treating a plurality of chlorosilane by-product streams is hereby incorporated by reference in its entirety, particularly its teachings with respect to hydrolyzing streams containing chlorosilicon compounds. A typical high-boiling residue by-product stream may include $(SiCH_2Si)_1(Cl)_4(Me)_2$, $(SiCH_2Si)_1(Cl)_5Me$, $(HSiOSi)_1(Cl)_3(Me)_2$, $(SiOSi)_1(Cl)_4(Me)_2$, $(SiCH_2Si)_1(Cl)_2(Me)_4$, $(SiSi)_1(Cl)_4(Me)_2$, and non-hydrolyzable or unknown solids. A typical low-boiling residue by-product stream may include $Me_2SiCl_2$, $EtMeSiCl_2$, $SiCl_4$, $Me_3SiCl$, $MeSiCl_3$, $MeHSiCl_2$, $AlkylMe_2SiCl$, $Me_2HSiCl$, $EtMeSiCl_2$, and non-hydrolyzable or unknown solids.

The chlorosilicon mixture is contacted with an aqueous medium to form a granular siloxane gel. The aqueous medium may initially consist of only water, but after hydrolysis, the aqueous medium may contain hydrochloric acid. The term "aqueous" means that the medium contains essentially water as the component reacting with the chlorosilicon mixture and excludes such organic components as alcohols which are reactive with the chlorosilicon mixture. The amount of aqueous medium employed can be varied widely, however it is preferred that sufficient water be present to completely hydrolyze the chlorosilicon mixture. Preferably the aqueous medium comprises about 20 to 100 weight percent water. The ratio of water to chlorosilicon mixture is in the range of about 2:1 to 10:1. In alternative embodiments of the method, a surfactant having a HLB number within a range of about 1 to 28 may be added to the aqueous medium, the chlorosilicon mixture, or both during, prior to or during formation of the granular siloxane gel. The amount of surfactant that may be present in step (A) are similar to those used in step (B) as described below.

The chlorosilicon mixture is hydrolyzed by contact with the aqueous medium at a temperature within a range of about 50° C. to 180° C. Preferably the contacting is conducted at a temperature within a range of about 60° C. to 90° C. Contacting the chlorosilicon mixture with the aqueous medium results in the formation of a granular siloxane gel and chloride hydrolyzed from the chlorosilicon mixture. A portion of the chloride contained within the granular siloxane gel dissolves in the aqueous medium to produce hydrochloric acid prior to conducting washing step (B). The granular siloxane gels may be separated from the aqueous medium prior to conducting step (B), if desired. Typically about 15 wt % to 20 wt % of the chloride initially present in the chlorosilicon mixture will be present in the separated aqueous medium. It is believed that by reducing the chloride content that the moisture content of the resulting siloxane gel is reduced as well, thereby reducing the granular siloxane gels weight and transportation disposal cost.

The granular siloxane gel of hydrolyzing step (A) is washed in step (B) with an aqueous solution comprising a surfactant having a HLB number within a range of about 1 to 28. The term "aqueous solution" means that the solution contains essentially water and a surfactant having a HLB number within a range of about 1 to 28. The washing may be conducted in any standard reactor or container suitable for contact with chlorosilanes. The granular siloxane gels may be added to the reactor containing the aqueous solution comprising the surfactant or the aqueous solution comprising the surfactant may be added to the reactor containing the granular siloxane gels. The chloride remaining in the granular siloxane gels dissolves in the aqueous solution containing the surfactant. The granular siloxane gels may be washed repeatedly to further reduce the chloride content to the desired level.

The surfactants useful in the present method have a hydrophilic-lipophilic balance number (HLB) within the range of about 1 to 28. The surfactants may be nonionic surfactants containing only carbon, hydrogen and oxygen. Anionic and cationic surfactants and those containing sulfur, nitrogen and phosphorus may be used, but are less preferred because it is believed their chemical functionality may react with the chlorosilane or liberated hydrochloric acid and detrimentally impact the usefulness of the granular siloxane gel. Examples of suitable nonionic surfactants are ethylene oxide and propylene oxide block copolymers such as a liquid ethylene oxide-propylene oxide-ethylene oxide block copolymer with a polyethylene core of approximately 1800 molecular weight units with a combined polymerized ethylene oxide content of 10 weight percent and having a total average molecular weight of 2000 and an HLB of 3 sold as Antarox®L-61, a liquid ethylene oxide-propylene oxide-ethylene oxide block copolymer with a polyethylene core of approximately 1800 molecular weight units with a combined polymerized ethylene oxide content of 20 weight percent and having a total average molecular weight of 2500 and an HLB of 7 sold as Antarox®L-62, a liquid ethylene oxide-propylene oxide-ethylene oxide block copolymer with a polyethylene core of approximately 1800 molecular weight units with a combined polymerized ethylene oxide content of 40 weight percent and having a total average molecular weight of 2900 and an HLB of 15 sold as Antarox®L-64, and a flake ethylene oxide-propylene oxide-ethylene oxide block copolymer with a polyethylene core of approximately 2400 molecular weight units with a combined polymerized ethylene oxide content of 80 weight percent and having a total average molecular weight of 11,400 and an HLB of 28 sold as Antarox®F-88 FLK. These Antarox® surfactants are manufactured by Rhodia, Cranbury, N.J., USA.

The preferred surfactants useful in the present method are described by formula $HO(CH_2CH_2O)_x(CH_2CH_3CHO)_y(CH_2CH_2O)_zH$, where x, y, and z are selected such that the surfactant has a hydrophilic-lipophilic balance number (HLB) within the range of about 1 to 28. Preferred is a HLB number within the range of about 3 to 15. Most preferred is a HLB number within the range of about 3 to 7. The surfactant formula is expressed as composition averages.

The surfactant concentration may comprise from about 0.5 to 50 wt % of the aqueous solution. The preferred surfactant concentration is from about 1 to 10 wt % of the aqueous solution.

The amount of aqueous solution used to wash the granular siloxane gels is about 2 to 25 times the gels weight. Preferably the amount of aqueous solution used to wash the granular siloxane gels is about 3 to 15 times the gels weight.

The granular siloxane gel chloride content is reduced by separating the granular siloxane gel from the aqueous solution comprising a surfactant having a HLB number within a range of about 1 to 28. Employing the present method the granular siloxane gel chloride content may be reduced to less than about 0.5 wt %.

The granular siloxane gels may be separated from the aqueous medium, or aqueous solution by any conventional manner, such as, filtration or centrifugation.

The following examples are provided to illustrate the present invention. The examples are not intended to limited the scope of the present claims.

EXAMPLE 1

Evaluation of reduction of the chloride content of a granular siloxane gel by water washing in the absence of a surfactant. A chlorosilicon mixture comprising a 70/30 weight percent mixture of a high-boiling residue by-product stream and a low-boiling residue by-product stream was formed. The weight percent of each component of the High-Boiling By-Product Stream and Low-Boiling By-Product Stream are recorded in Table 1 and Table 2. The chlorosilicon mixture (200 g) was added to an agitated aqueous medium of 36 weight percent hydrochloric acid at 65° C. The chlorosilicon mixture was hydrolyzed for 0.25 hours and the aqueous medium removed by filtration. A non-uniform mixture of sinking, floating and suspended granular siloxane gels were formed.

A 20 gram sample of the granular siloxane gels formed above were added to a 500 ml flask containing 60 grams of water. The flask contents were agitated and maintained at 20° C. for 0.1 hours. The flask content were poured into a sieve lined with a paper towel to remove excess moisture. A 0.5 gram sample of the washed granular siloxane gel was analyzed to determine chloride using a silver nitrate titration technique.

The remaining granular siloxane gel (15 gram) was washed a second time with fresh water as described above. The washing process was repeated a total of six times to further reduce the granular siloxane gel chloride content. The initial granular siloxane gel wt % chloride and wt % chloride of each 0.5 gram granular siloxane gel sample after washing with fresh water are reported in Table 3.

TABLE 1

High-Boiling Residue By-Product Stream

| Component | Weight Percent |
|---|---|
| $(SiCH_2Si)_1(Cl)_4(Me)_2$ | 32 |
| $(SiCH_2Si)_1(Cl)_5Me$ | 28 |
| $(HSiOSi)_1(Cl)_3(Me)_2$ | 4 |
| $(SiOSi)_1(Cl)_4(Me)_2$ | 4 |
| $(SiCH_2Si)_1(Cl)_2(Me)_4$ | 3 |
| $(SiSi)_1(Cl)_4(Me)_2$ | 1 |
| Non-hydrolyzable or unknown | 7 |
| Solids | 22 |

TABLE 2

Low-Boiling Residue By-Product Stream

| Component | Weight Percent |
|---|---|
| Me$_2$SiCl$_2$ | 37 |
| EtMeSiCl$_2$ | 17 |
| SiCl$_4$ | 10 |
| Me$_3$SiCl | 8 |
| MeSiCl$_3$ | 3 |
| MeHSiCl$_2$ | 3 |
| AlkylMe$_2$SiCl | 3 |
| Me$_2$HSiCl | 2 |
| EtMeSiCl$_2$ | 1 |
| Non-hydrolyzable or unknown | 16 |

In the tables Me stands for methyl, Et stands for ethyl, H stands for hydrogen, and alkyl refers to any monovalent hydrocarbon radical other than methyl or ethyl bonded to silicon.

TABLE 3

| Initial Wt % Chloride | Wt % Chloride After 1$^{st}$ Washing | Wt % Chloride After 2$^{nd}$ Washing | Wt % Chloride After 6$^{th}$ Washing |
|---|---|---|---|
| 20.01 | 5.20 | 2.78 | 2.36 |

EXAMPLE 2

Evaluation of reduction of the chloride content of a granular siloxane gel washed with an aqueous solution comprising a surfactant. The granular siloxane gel formed in Example 1 was water washed and the initial chloride concentration determined as in Example 1. The remaining granular siloxane gel (15 gram) was separated and washed a second time by adding to 500 ml flasks containing either an aqueous solution comprising two wt % of a surfactant described as a liquid ethylene oxide-propylene oxide-ethylene oxide block copolymer with a polyethylene core of approximately 1800 molecular weight units with a combined polymerized ethylene oxide content of 10 weight percent and having a total average molecular weight of 2000 and an HLB of 3, or an aqueous solution comprising two wt % of a surfactant described as a liquid ethylene oxide-propylene oxide-ethylene oxide block copolymer with a polyethylene core of approximately 1800 molecular weight units with a combined polymerized ethylene oxide content of 20 weight percent and having a total average molecular weight of 2500 and an HLB of 7 as indicated in Table 4. Both surfactants were purchased from Rhodia, Cranbury, N.J., USA under the trade name Antarox®L-61 and Antarox®L-62 and had a HLB number of 3 and 7 respectively. The surfactant HLB number was experimentally determined or calculated by summing up the contributions of the surfactants' individual molecular structures. The flask contents were agitated for 0.25 hours and then poured into a sieve lined with a paper towel to remove excess moisture. A 0.5 gram granular siloxane gel sample was analyzed using a silver nitrate titration technique to determine the chloride concentration. The initial granular siloxane gel wt % chloride, wt % chloride after 2$^{nd}$ washing with the aqueous solution comprising the surfactant, surfactant HLB number, wt % aqueous solution/granular siloxane gels, and temperature at which 2$^{nd}$ washing where conducted are reported in Table 4.

TABLE 4

| Temperature ° C. | Initial Wt % Chloride | Surfactant HLB | Wt % Aqueous Solution/Gel | Wt % Chloride After 2$^{nd}$ Washing |
|---|---|---|---|---|
| 25 | 17.3 | 7 | 1500 | 0.94 |
| 65 | 17.3 | 7 | 1500 | 0.49 |
| 65 | 17.3 | 3 | 1000 | 1.01 |

EXAMPLE 3

Evaluation of reduction the of chloride content of a granular siloxane gel formed from a chlorosilicon mixture containing a surfactant and washed with an aqueous solution comprising a surfactant. An aqueous solution comprising two wt % surfactant was added to a chlorosilicon mixture comprising a 70/30 percent mixture of a high-boiling by-product stream and a low-boiling by-product stream. The surfactants added to the chlorosilicon mixture were Antarox®L-61 with a HLB number of 3 or Antarox®L-62 with a HLB number of 7 as indicated in Table 5. The weight percent of each component of the High-Boiling By-Product Stream and Low-Boiling By-Product Stream are recorded in Table 1 and Table 2. The chlorosilicon mixture containing the surfactant (200 grams) was added to an agitated aqueous medium of 36 percent hydrochloric acid at 65° C. The chlorosilicon mixture containing the surfactant was hydrolyzed for 0.25 hours and then the aqueous medium removed by filtration to form a granular siloxane gel.

The granular siloxane gel (20 gram) formed above was water washed and the initial chloride concentration determined as in Example 1. The remaining granular flasks containing either an aqueous solution comprising two wt % surfactant described as Antarox®L-61 with a 3 HLB number or Antarox®L-62 with a 7 HLB number as indicated by Table 5. The flask contents were agitated for 0.25 hours and then poured into sieves lined with paper towels to remove excess moisture. A granular siloxane gel sample was analyzed to determine the chloride concentration as described in Example 2. The initial granular siloxane gel wt % chloride, wt % chloride after 2$^{nd}$ washing, surfactant HLB number, wt % aqueous solution/granular siloxane gels, and temperature are reported in 5.

TABLE 5

| Temperature ° C. | Initial Wt % Chloride | Surfactant HLB in Chlorosilicon Mixture | Wash Surfactant HLB | Wt % Aqueous Solution/ Gel | Wt % Chloride After 2nd Washing |
|---|---|---|---|---|---|
| 25 | 18.5 | 3 | 3 | 1500 | 0.77 |
| 25 | 18.6 | 7 | W | 1500 | 0.61 |
| 65 | 18.5 | 3 | 3 | 1500 | 0.47 |
| 65 | 18.6 | 7 | W | 1500 | 0.45 |
| 65 | 18.5 | 3 | W | 1000 | 0.52 |
| 65 | 17.7 | 15 | W | 1000 | 0.70 |
| 65 | 6.0 | 28 | W | 1000 | 0.39 |

W=water only, no surfactant

We claim:

1. A method of forming a granular siloxane gel having reduced chloride content comprising:

(A) contacting a chlorosilicon mixture with an aqueous medium at a temperature within a range of about 50° C. to 180° C. to form a granular siloxane gel, where the weighted average of the number of Si—Cl bonds in the chlorosilicon mixture is greater than or equal to 2.8, (B) washing the granular siloxane gel with an aqueous solution comprising a surfactant having a HLB number within a range of about 1 to 28 thereby reducing the chloride content of the granular siloxane gel.

2. The method according to claim 1, where the aqueous medium further comprises a surfactant having a HLB number within a range of about 1 to 28.

3. The method according to claim 1, where the chlorosilicon mixture further comprises a surfactant having a HLB number within a range of about 1 to 28.

4. The method according to claim 1, where the granular siloxane gel is separated from the aqueous medium prior to washing with the aqueous solution.

5. The method according to claim 1, where the surfactant has a HLB number within a range of about 3 to 15.

6. The method according to claim 1, where the surfactant has a HLB number within a range of about 3 to 7.

7. The method according to claim 1, where the surfactant is nonionic.

8. The method according to claim 1, where the contacting of the chlorosilicon mixture with the aqueous medium is at a temperature within a range of 60° C. to 90° C.

9. The method according to claim 1, where the surfactant comprises about 0.5 to 50 weight percent of the aqueous solution.

10. The method according to claim 1, where the surfactant comprises about 1 to 10 weight percent of the aqueous solution.

11. The method according to claim 1, where the weight of aqueous solution used to wash the granular siloxane gel is about 2 to 25 times the weight of the granular siloxane gel.

12. The method according to claim 1, where the weight of aqueous solution used to wash the granular siloxane gel is about 3 to 15 times the weight of the granular siloxane gel.

13. The method according to claim 1, where the surfactant is described by average formula $HO(CH_2CH_2O)_x(CH_2CH_3CHO)_y(CH_2CH_2O)_zH$, where x, y, and z are selected such that the surfactant has a HLB number within a range of about 1 to 28.

14. The method according to claim 13, where the surfactant is a liquid ethylene oxide-propylene oxide-ethylene oxide block copolymer with a polyethylene core of approximately 1800 molecular weight units with a combined polymerized ethylene oxide content of 10 weight percent and having a total average molecular weight of 2000 and an HLB of 3.

15. The method according to claim 13, where the surfactant is a liquid ethylene oxide-propylene oxide-ethylene oxide block copolymer with a polyethylene core of approximately 1800 molecular weight units with a combined polymerized ethylene oxide content of 20 weight percent and having a total average molecular weight of 2500 and an HLB of 7.

16. The method according to claim 13, where the surfactant is a liquid ethylene oxide-propylene oxide-ethylene oxide block copolymer with a polyethylene core of approximately 1800 molecular weight units with a combined polymerized ethylene oxide content of 40 weight percent and having a total average molecular weight of 2900 and an HLB of 15.

17. The method according to claim 13, where the surfactant is a flake ethylene oxide-propylene oxide-ethylene oxide block copolymer with a polyethylene core of approximately 2400 molecular weight units with a combined polymerized ethylene oxide content of 80 weight percent and having a total average molecular weight of 11,400 and an HLB of 28.

18. A method of reducing chloride content of a granular siloxane gel comprising:

(A) contacting a granular siloxane gel containing chloride with an aqueous solution comprising a surfactant at a temperature within a range of about 50° C. to 180° C., where the surfactant has a HLB number within a range of about 1 to 28 and (B) separating the granular siloxane gel from the aqueous solution thereby recovering a granular siloxane gel with reduced chloride content.

19. A method of reducing chloride content of a granular siloxane gel comprising:

(A) contacting a mixture comprising a chlorosilicon mixture where the weighted average of the number of Si—Cl bonds in the mixture is greater than or equal to 2.8, with an aqueous medium in the presence of a surfactant at a temperature within a range of about 50° C. to 180° C. to form a granular siloxane gel, where the surfactant has a HLB number within a range of about 1 to 28 and (B) separating the granular siloxane gel from the aqueous medium thereby recovering a granular siloxane gel with reduced chloride content and (C) further washing the granular siloxane gel with an aqueous solution comprising a surfactant having a HLB number within a range of about 1 to 28.

* * * * *